Jan. 5, 1965  G. V. OLSON  3,164,283
POWER RIVET GUN
Filed May 15, 1963  2 Sheets-Sheet 1

INVENTOR.
GLENN V. OLSON
BY
Moore, White & Burd
ATTORNEYS

Jan. 5, 1965  G. V. OLSON  3,164,283
POWER RIVET GUN
Filed May 15, 1963  2 Sheets-Sheet 2
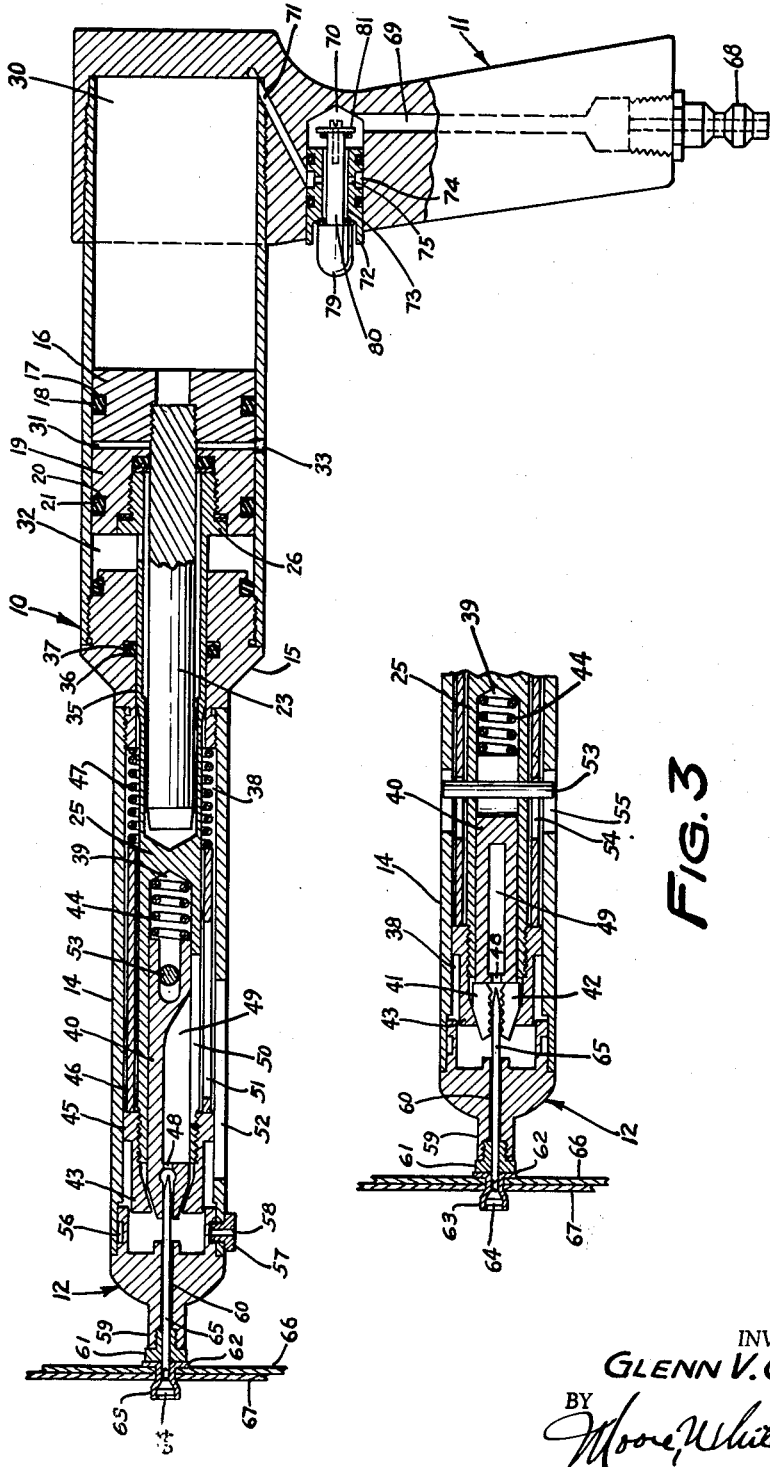
INVENTOR.
GLENN V. OLSON
BY Moore, White & Burd
ATTORNEYS

United States Patent Office 3,164,283
Patented Jan. 5, 1965

3,164,283
POWER RIVET GUN
Glenn V. Olson, 1220 Bradley, St. Paul, Minn.
Filed May 15, 1963, Ser. No. 280,565
9 Claims. (Cl. 218—47)

This invention relates to a power rivet gun of the general type wherein the hollow tubular rivet is inserted into the work and secured therein from the same side of the work. More particularly, the invention relates to an air-hydraulic power rivet gun for the setting of so-called blind rivets of the type in which the hollow tubular rivet is inserted into the work mounted on the shank of a headed mandrel and the blind side of the rivet is clinched by expanding the tubular rivet by pulling the head of the mandrel into the rivet and snapping it off from the headless shank of the mandrel.

The principal object of this invention is to provide a power rivet gun for the blind application of tubular rivets which is, at the same time, compact, vibration free, and fast and easy to operate.

A further object of the present invention is to provide a power rivet gun operated on gas pressure, and having a hydraulic action.

A still further object of the present invention is to provide an air-hydraulic power rivet gun provided with means for automatically regripping rivet mandrels and ejecting spent broken headless mandrels.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 2 is a similar elevation, in section, in which the moving parts are shown in compressed stroke operating position; and FIGURE 3 is a partial section on the line 3—3 of FIGURE 2 and in the direction of the arrows.

Figure 1:
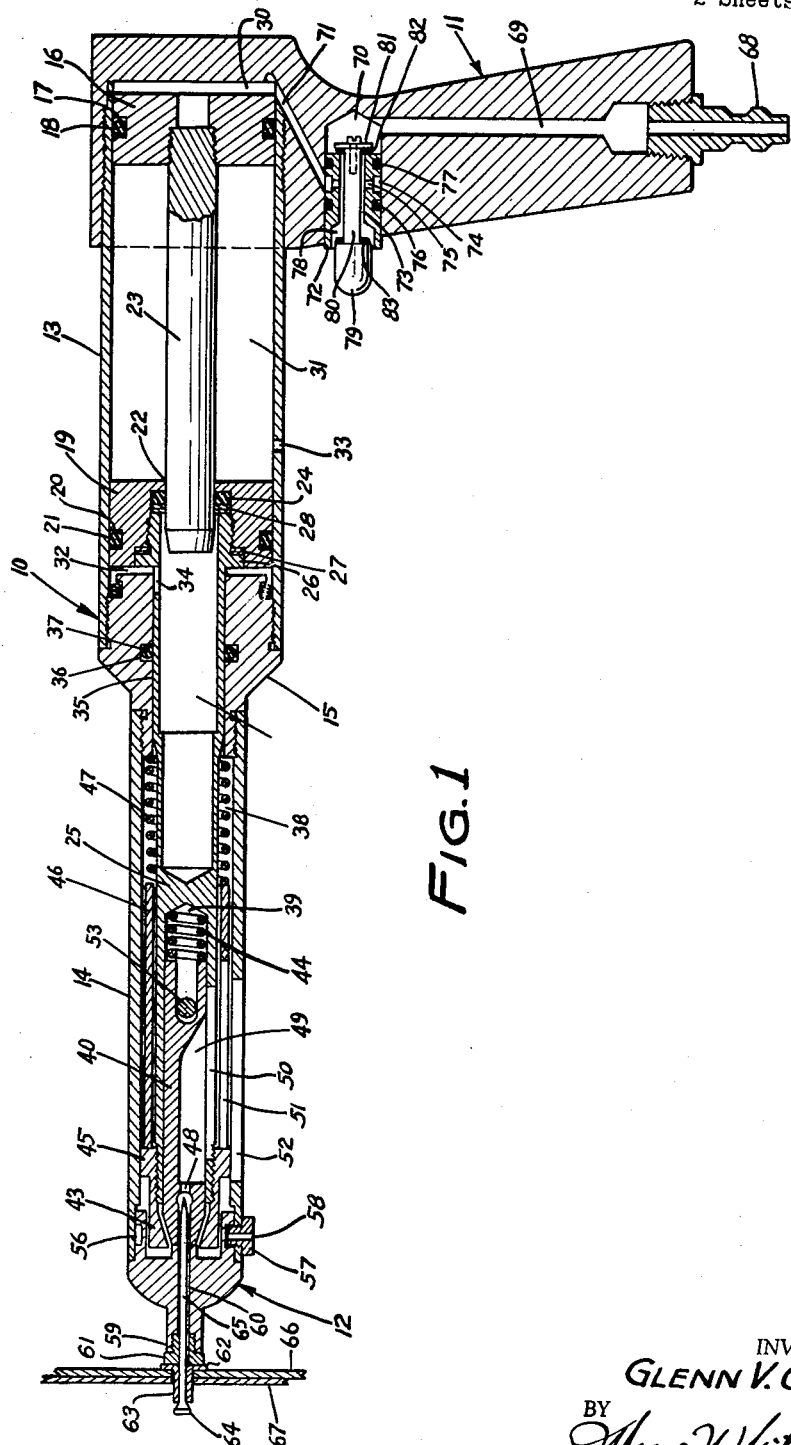
FIGURE 1 is an elevation, in section, of the power rivet gun according to the present invention in which the moving parts are shown in relaxed position.

Referring to the drawings, the power rivet gun according to the present invention, includes an elongated air and hydraulic assembly, indicated generally at 10, which is supported at one end by a handle, indicated generally at 11, and which carries a nozzle 12 at its opposite end. The air and hydraulic assembly includes an air-hydraulic cylinder 13 which is provided with external threads at one end by which it is seated in and secured to the handle 11. At the opposite end of cylinder 13 is a forwardly extending and axially aligned tubular housing 14 of lesser diameter secured to the cylinder by means of a fitting 15. Fitting 15 is preferably provided with external threads, and the forward en dof cylinder 13 and rearward end of tubular housing 14 are preferably internally threaded for easy assembly of the parts.

A piston 16 is provided in cylinder 13. The periphery of piston 16 is provided with an annular groove 17 in which is fitted a resilient O-ring 18 to insure a tight fit between the piston and the inside cylinder wall. A further piston 19 is provided in cylinder 13. The outer periphery of piston 19 is provided with an annular groove 20 in which is fitted a resilient O-ring 21 to insure a tight fit between the piston 19 and the inside cylinder wall.

Piston 19 is provided with a central bore 22 in which is fitted a further elongated piston 23 which is secured to piston 16 for movement therewith. The bore 22 of piston 19 is enlarged on one side and provided with an O-ring 24 to insure a tight fit between piston 23 and bore 22.

An actuating rod or shaft 25 is connected for movement with piston 19. The rearward end of the actuating rod is provided with external threads for engagement with internal threads in the enlarged bore of piston 19. The actuating rod is provided with a flange or collar 26 which seats against gasket 27 in the piston 19 to provide a fluid seal. O-ring 24 is held seated in the bottom of the enlarged bore of piston 19 by the end of the actuating rod and a spacer or gasket 28. The rearward end of actuating rod or shaft 25 is hollow to provide a fluid chamber 29 to be filled with a hydraulic fluid.

Cylinder 13 is divided into three chambers of varying volumes depending upon the relative positions of the pistons 16 and 19 therein. The first cylinder chamber 30 is between piston 16 and the rear cylinder wall formed by the handle 11. The intermediate cylinder chamber 31 is between pistons 16 and 19 and is traversed by piston 23. The third cylinder chamber 32 is between piston 19 and the end wall of fitting 15. Chambers 30 and 31 are gas chambers. A bleeder opening or port 33 is provided from chamber 31 for escape of gas during the forward stroke of piston 16. Cylinder chamber 32 is a hydraulic fluid chamber, as is chamber 29 in the actuating rod 25. These two chambers communicate through a port 34.

As piston 16 is moved forward under gas pressure introduced into chamber 30, as explained in detail hereinafter, piston 23 moves forward into chamber 29 expelling hydraulic fluid from that chamber through port 34 into cylinder chamber 32. As chamber 32 fills with fluid under pressure, piston 19 is forced backwardly and draws with it actuating rod 25 and its associated mechanism.

Fitting 15 is provided with a central bore 35 in which actuating rod 25 fits with a slide fit. The inner periphery of bore 35 is provided with an annular groove 36 in which is fitted an O-ring 37 to insure a tight fit between the outer wall of the actuating rod and the inner wall of the bore to prevent loss of hydraulic fluid.

The actuating rod or shaft 25 is elongated and extends toward the rivet gun nozzle 12. The actuating rod is axially aligned with and fits within the tubular housing 14 so as to leave an annular space 38 between the actuating rod and tubular housing. The forward end of actuating rod 25 is likewise hollow or tubular to provide a chamber 39. Into this space is fitted a jaw sleeve 40. Both ends of jaw sleeve 40 are bifurcated. The forward end of the jaw sleeve 40 is tapered and a pair of opposing jaws 41 and 42 are fitted into the bifurcated tapered forward end of the jaw sleeve.

The forward end of actuating rod 25 is externally threaded and an internally tapered jaw retainer 43 is attached thereto. The jaw sleeve 40 is movable relative to the actuating rod. Accordingly, as the tapered bifurcated forward end of the jaw sleeve containing jaws 40 and 41 moves relative to the internally tapered jaw retainer, 43, pressure is exerted against, or released from, the jaws causing them to tighten or release their grip against the shank 44 of a rivet mandrel.

Jaw sleeve 40 moves within chamber 39 in actuating rod 25 against a spiral spring 44 seated in the rearward end of chamber 39. Jaw retainer 43 is provided with an outwardly extending annular flange or collar 45 which bears against a tubular sleeve 46 and spiral spring 47 housed in the annular space 38 between the tubular housing 14 and actuating rod 25.

A central aperture or bore 48 is provided in the forward bifurcated jaw-containing end of jaw sleeve 40 communicating with a longitudinal slot 49 for discharge of spent rivet mandrels from the gun. A corresponding communicating longitudinal slot 50 is provided in the wall of actuating rod 25 adjacent chamber 39 and corresponding communicating longitudinal slots 51 and 52 are provided in sleeve 46 and tubular housing 14, respectively.

In order to keep the parts in alignment, so that slots 49, 50, 51 and 52 communicate, a pin 53 is provided. The position of pin 53 is fixed in the opposite side walls of chamber 39 in the forward end of actuating rod 25. Pin 53 fits within the bifurcated rear end of jaw sleeve 40 to permit relative movement of the jaw sleeve with respect to the pin while maintaining the jaw sleeve in alignment. Longitudinal slots 54 and 55 are provided in sleeve 46 and tubular housing 14, respectively, to permit relative movement between the actuating rod 25 carryng pin 53 and those parts while at the same time maintaining all of the parts in alignment.

As shown, nozzle 12 fits telescopically into the forward end of tubular housing 14. The rearward end of the nozzle is provided with an annular channel or groove 56 by which the nozzle is retained in the end of the tubular housing by means of a set screw 57. Set screw 57 is desirably in the form of a bushing having a central aperture 58 adapted to receive one size of rivet mandrel and interchangeable with a bushing having an aperture of different size at the nozzle tip. Alternatively, nozzles having different aperture sizes may be provided.

The nozzle is desirably provided with a tip 59 of reduced diameter for easy access to confined areas. A central bore 60 extends longitudinally through the nozzle. A bushing 61 is fitted into the nozzle tip. Bushing 61 is desirably interchangeable with set screw bushing 57, and provided with an aperture of different diameter as an adapter for rivet mandrels of a different size.

The rivet gun of the present invention is intended for use with hollow rivets having a flat annular head 62 and a tubular shank 63. The rivet is supplied with a mandrel having a head 64 and an elongated shank 65 extending through the hollow rivet in the direction toward the rivet head. The rivet is inserted through the work, in this instance two pieces of sheet metal or the like, 66 and 67, from the accessible exposed or rivet gun side of the work. The rivet is inserted with the rivet head butting against the exposed surface of the work piece.

The mandrel shank 65 is received through the nozzle of the rivet gun and grasped by the toothed jaws 41 and 42. Then, as the rivet gun is operated, the actuating rod 25 is drawn backwardly pulling with it the mandrel, causing the head of the mandrel to expand and upset the tubular portion of the rivet shank extending through the work to clinch the rivet and secure the two pieces of sheet material comprising the work tightly together. As further force is exerted upon the mandrel, the shank 65 snaps free from the head 64. The head remains in place in the expanded rivet and the freed spent shank is expelled through the discharge slots 49–52 of the gun.

The rivet gun is operated by fluid pressure, preferably compressed gas, such as air under pressure, as follows. Handle 11 is preferably in the form of a pistol grip. A fitting 68 is provided in the bottom of the handle for connection of the gun by means of flexible tubing or the like to a source of gas under pressure. The gun is desirably operated on air pressures of about 75 to 150 pounds per square inch. Hollow fitting 68 communicates with a gas channel 69 in the handle leading to a gas valve chamber 70. A further gas channel 71 extends from valve chamber 70 to cylinder chamber 30.

The gas valve mechanism includes a fitting 72 secured in place in the gas valve chamber 70. Fitting 72 is provided with a central bore 73 which is in communication with chamber 70 and an outer annular groove or channel 74 which is in communication with one end of gas channel 71. A plurality of ports 75 provide communication between central bore 73 and annular channel 74. A pair of O-rings 76 and 77 fitted in grooves on the outside of fitting 72 on opposite sides of annular channel 74 provides a gas tight fit.

The outside end of bore 73 is enlarged at 78 and a valve button 79 is inserted therein. Valve button 79 carries a valve stem or shank 80 which extends through the central bore 73 and is provided at its opposite end with a valving element in the form of disc 81 of enlarged diameter which retains a resilient disc or ring gasket 82. Gas under pressure in chamber 70 acts upon disc 81 and presses gasket 82 in place around the inside end of bore 73 to prevent passage of gas to actuate the gun.

A further valving element in the form of resilient or O-ring gasket 83 is provided around the valve stem adjacent valve button 79. When the valve button is depressed by finger pressure, the gasket 82 is unseated to permit flow of gas into the annular bore 73, but flow gas out through the opposite end of the annular bore is prevented by gasket 83 seating in the enlarged bore 78 of the gas valve fitting. Thus, the gas under pressure flowing into the bore 73 flows out through ports 75 into annular chamber 74 and gas channel 71 to cylinder chamber 30.

In the operation of the power rivet gun, a rivet assembled with mandrel in place is inserted in the work and the shank of the mandrel is received through the nozzle of the rivet gun and engaged by the jaws 41 and 42. The rivet may first be inserted in the work, or perhaps more conveniently, the rivet is first inserted in the gun and then in the work. The gun is connected to a source of gas under pressure. The gas pressure in chamber 70 normally maintains the gas valve closed.

With the rivet in place in the work, the operator simply depresses valve button 79 to seat gasket 83 in the bottom of enlarged bore 78 of the gas valve fitting. This unseats gasket 82 permitting the gas under pressure to flow from gas chamber 70 through the central bore 73 and ports 75 into annular chamber 74, from whence it passes through gas channel 71 to cylinder chamber 30.

The gas under pressure in chamber 30 forces pistons 16 and 23 forward. Cylinder chamber 31 is open to the atmosphere. The action of piston 16 moving forward in that chamber forces the air contained therein out through the bleeder port 33.

Piston 23 moving forward under pressure into chamber 29 acts upon the hydraulic fluid contained therein, forcing that fluid out through port 34 into cylinder chamber 32. This flow of oil causes chamber 32 to expand, forcing piston 19 rearwardly. This action may be seen with reference to FIGURE 2 which shows the parts in compressed stroke position.

As piston 19 is forced rearwardly, actuating rod or shaft 25 is also forced rearwardly. As this occurs, jaw retainer 43, which is attached to the opposite end of the actuating rod, is drawn backwardly until the inside tapered face of the retainer engages the jaws 41 and 42 causing them to tighten their grip on the shank of the mandrel. Further movement of the jaw retainer then causes the jaw sleeve to be drawn backwardly from the nozzle to pull the mandrel head into the tubular shank of the rivet to expand and upset the same. Further movement of the jaw retainer causes the jaws to snap off the shank of the mandrel. Jaw sleeve 40 is under constant spring pressure from spiral spring 44 urging the jaws into engagement with the jaw retainer.

As the jaw retainer 43 is drawn back, return spring 47 is compressed by means of the force exerted through sleeve 46. The action of the air and hydraulic pistons and the smooth hydraulic action engaging the rivet mandrel and seating the rivet occurs almost instantaneously.

When the operator releases finger pressure from valve button 79, the air pressure in air chamber 70 again seats the valve gasket 81 and pressure on cylinder chamber 30 is relieved. Return spring 47, which was compressed further during the riveting action, expands and exerts pressure through sleeve 46 against the collar 45 of jaw retainer 43 pushing the jaw retainer forward.

As the jaw retainer 43 moves forward, it carries with it actuating rod 25 which pulls piston 19 forward. As piston 19 moves forward, the hydraulic fluid in chamber 32 is forced through port 34, into chamber 29, and the increased volume of fluid in this chamber forces piston 23 backwardly.

As piston 23 is forced backwardly, piston 16 to which it is connected, is also forced backwardly. The air in cylinder chamber 30 bleeds out through gas channel 71 to the annular channel 74 of the gas valve and thence through ports 75 to the central bore 73 from whence it escapes to the atmosphere. Atmospheric air enters through port 33 to occupy the expanding cylinder chamber 31.

As the actuating rod 25, jaw sleeve 40 and jaw retainer 43 move forward together under influence of return spring 47, jaw sleeve 40 first engages the inside end of the nozzle and then remains stationary under pressure of spiral spring 44 as the actuating rod 25 and jaw retainer 43 continue to move forward a short distance to disengage jaws 41 and 42. The rivet gun is thus returned to its relaxed at-rest position. The spent rivet mandrel is readily passed through the jaws, through aperture 48 in jaw sleeve 40, and out through the aligned longitudinal slots 49-52. The entire cycle requires only the briefest instant.

The fast vibration-free hydraulic action makes possible fast, low cost fastening to give volume production. The rivet gun according to the present invention, is useful for a wide variety of fastening problems in almost every industry. Typical examples include the attachment of automobile body panels, moldings and strips to eliminate spot welding screws and bolts; metal window channels; assembly of both plastic and metal signs, including neon tube supports and the like; assembly of all sorts of sheet material including ducts for heating and air-conditioning; etc.

It is apparent that may modifications and variations of this invention as hereinbefore set forth may be made without departing from the spirit and scope thereof. The specific embodiments described are given by way of example only and the invention is limited only by the terms of the appended claims.

I claim:

1. A power rivet gun comprising a hollow body in the form of a tubular housing having a longitudinal bore therein, a nozzle secured to one end of said bore and having a restricted bore axially aligned therewith, said restricted bore being adapted to receive the headless shank end of a mandrel having an enlarged head at its opposite end for engaging the headless end of a hollow rivet supported on the mandrel, means in the longitudinal bore of the body for gripping a mandrel, said gripping means comprising opposed jaws and means longitudinally movable within said tubular body to engage said jaws and move them longitudinally within the tubular body, a first fluid pressure chamber secured to the opposite end of said longitudinal bore, first piston means in said chamber connected to said gripping means to operate the same, further composite piston means in said chamber to actuate said first piston, said longitudinally movable means for engaging the gripping jaws including an actuating rod, said actuating rod being connected to said first piston, a further fluid pressure chamber in the end of the actuating rod remote from said nozzle, said further piston means including a smaller piston movable in said further fluid pressure chamber and connected to a larger piston movable in said first fluid pressure chamber, and means for introducing fluid under pressure to said first chamber to actuate said further composite piston means to thereby actuate said first piston, said gripping means being operative upon successive actuation of both of said piston means to draw the mandrel into the nozzle to cause the head on the mandrel to expand the walls of a hollow rivet and separate from the headless end of the mandrel.

2. A power rivet gun according to claim 1 further characterized in that said further fluid pressure chamber is filled with a non-compressible fluid and said other fluid pressure chamber is provided with means for connection to a source of fluid under pressure and valve means for controlling the flow of such pressurized fluid.

3. A power rivet gun according to claim 1 further characterized in that said first fluid pressure chamber is cylindrical and axially aligned with the bore of said hollow body, said gun is provided with pistol grip handle means supporting said first chamber and valve means in said handle for controlling flow of fluid therethrough to said first chamber.

4. A power rivet gun according to claim 1 further characterized by the provision of a longitudinal slot in said hollow body spaced from said nozzle and adjacent to said mandrel gripping means for ejection of the separated headless end of the rivet supporting mandrel after operation of the gun.

5. A power rivet gun according to claim 1 further characterized by the provision of spiral spring return means within said tubular housing and around said longitudinally movable means, said spring means being engageable by said longitudinally movable means to be compressed by the movable means moving in one direction away from said nozzle and to expand to move the movable means in the opposite direction.

6. A power rivet gun comprising a hollow tubular body having a longitudinal bore therein; a nozzle secured to one end of said tubular body and having a restricted bore axially aligned with the longitudinal bore thereof, said restricted bore being adapted to receive the headless shank end of a mandrel having an enlarged head at its opposite end for engaging the headless end of a hollow rivet supported on the mandrel; a first cylindrical fluid pressure chamber secured to the opposite end of said tubular body in axial alignment therewith, first and second piston means in said chamber; means in the longitudinal bore of the tubular body for gripping a mandrel, said means including opposed coacting jaws and tubular actuating rod means longitudinally movable within said tubular body and having a tapered bore therein at one end to engage said jaws and move them longitudinally within the tubular body, a further fluid pressure chamber within said actuating rod at the opposite end thereof in axial alignment with the tubular body; said actuating rod being secured to and longitudinally movable with said first piston means for operation of the gripping means, said second piston means including a piston movable in said further pressure chamber and connected to a piston movable in said first cylindrical chamber to actuate said first piston; a non-compressible fluid in said further fluid pressure chamber, means for connection of said first fluid pressure chamber to a source of fluid under pressure, and valve means for controlling the flow of such pressurized fluid to actuate said second piston means; said gripping means being operative upon longitudinal movement upon actuation of said piston means to draw the mandrel into the nozzle to cause the head on the mandrel to expand the walls of a hollow rivet and separate from the headless end of the mandrel.

7. A power rivet gun according to claim 6 further characterized in that aligned longitudinal slots are provided in said actuating rod means and in said tubular body spaced from said nozzle and adjacent to the coacting jaws for ejection of the separated headless end of the rivet supporting mandrel after operation of the gun.

8. A power rivet gun according to claim 6 further characterized in that spiral spring return means are provided within said tubular housing and around said actuating rod means, said spring means being engageable by said actuating rod means to be compressed thereby when moving in one direction away from the nozzle and to expand to move the actuating rod means in the opposite direction.

9. A power rivet gun according to claim 6 further characterized in that said gun is provided with a pistol grip handle means supporting said first cylindrical fluid pressure chamber, fluid flow channel means through said handle means, means on said handle to connect said channel means to a source of fluid under pressure, and trigger finger actuated valve means in said handle for controlling flow of fluid therethrough to said fluid pressure chamber.

References Cited in the file of this patent
UNITED STATES PATENTS

| | | |
|---|---|---|
| 2,053,718 | Huck et al. | Sept. 8, 1936 |
| 3,082,898 | Bosch | Mar. 26, 1963 |